June 7, 1949.   H. NISSEN   2,472,544
ELECTROMAGNETIC HILL HOLDER FOR VEHICLES
Filed Jan. 21, 1946
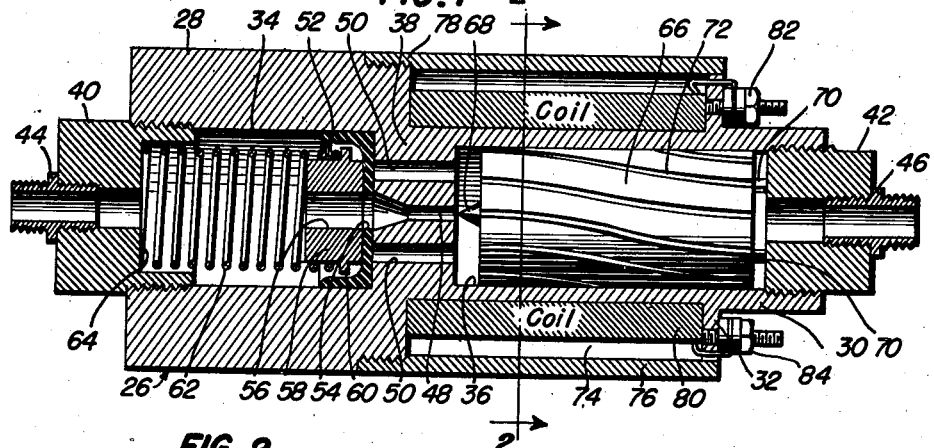
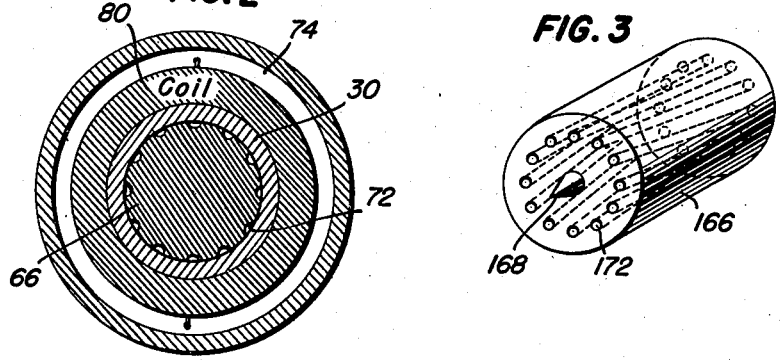
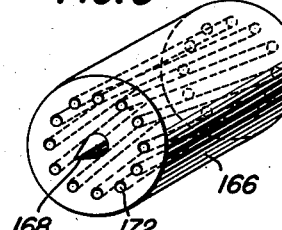
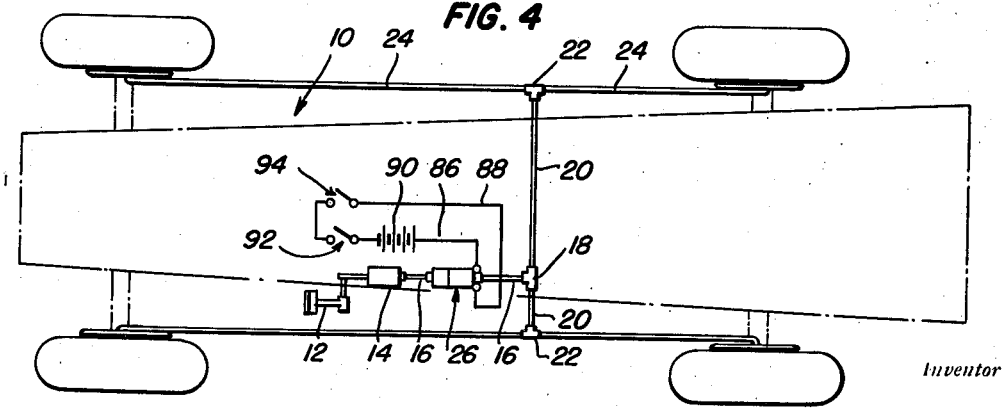
Inventor
HENRY NISSEN
By *Clarence A. O'Brien and Harvey B. Jacobson*
Attorneys Patented June 7, 1949

2,472,544

UNITED STATES PATENT OFFICE 2,472,544

ELECTROMAGNETIC HILL HOLDER FOR VEHICLES

Henry Nissen, Hartford, Conn., assignor to Alfred Minukas, Hartford, Conn.

Application January 21, 1946, Serial No. 642,483

11 Claims. (Cl. 137—139)

This invention relates to an electro-magnetic hill holder for vehicles and comprises generally a manually operable, solenoid actuated, valve means for selectively preventing release of pressure upon the brakes of a hydraulic brake system for vehicles, to maintain the brakes in actuated condition, at any desired pressure.

The primary object of the invention is the provision of a reliable, inexpensive and simple attachment for hydraulic brake systems, which can readily be installed in any existing system and which will not impair or alter the normal functioning of such systems.

An important object of the invention is the provision of an attachment of the nature above described, which will lock or freeze the brakes at any portion of their actuating range.

A further important object of the invention is the provision of an attachment in accordance with the foregoing objects, which permits the application of increased brake pressure without disturbing its non-return, locking effect upon the system.

A still further object of the invention is the provision of an attachment in accordance with each of the foregoing objects, whereby the hydraulic system may be locked without necessitating the continued attention or presence of the driver.

Another important object of the invention is the provision of an attachment in accordance with each of the foregoing objects, whereby the device is assisted or facilitated into opening and seating movement by the passage of the brake fluid.

An additional object of the invention is the provision in a device of the nature described, of a valve means having self-cleaning and self-moving features of structure, enhancing thereby its durability and efficiency.

An auxiliary object of the invention is the provision of a device of the nature described, which may be rendered inoperative until a vital electrical circuit of the vehicle, such as the ignition system, is energized.

A secondary object of the invention is the provision of a device of the nature described, wherein immediate release of the hydraulic lock is effected.

These and other important objects, as will become later apparent, are attained in the invention as set forth in the following description and drawing, wherein:

Figure 1 is a vertical sectional view, parts being shown in elevation;

Figure 2 is a vertical sectional view taken substantially along the line 2—2 of Figure 1, and looking in the direction of the arrows;

Figure 3 is a perspective view of a modified form of plunger employed in the device of Figure 1; and Figure 4 is a diagrammatic view showing the invention applied to the hydraulic brake system of a motor vehicle.

Referring now to the accompanying drawings, Figure 4 indicates diagrammatically a motor vehicle indicated generally at 10, including a hydraulic brake system of any suitable design and comprising the customary brake pedal 12, operatively associated with the master cylinder 14. Pressure line 16 extends from the master cylinder to any desired type of conduit assembly connecting with each of the wheel brake cylinders, and in the present instance is shown as consisting of a fitting 18, from whence laterally extending lines 20, terminating in fitttings 22, are associated with forwardly and rearwardly extending lines 24, leading to the individual wheel brake cylinders, not shown.

Disposed at any desired point in the pressure line between the master cylinder and the wheel brake cylinders, is the improved hydraulic locking means forming the subject of this invention and indicated generally at 26. By way of example, I have shown this means conveniently positioned in the line 16, between the master cylinder 14 and the fitting 18.

Turning now to Figure 1, it will be seen that the lock means 26 is formed with a body member 28, depending from an end portion 30 of reduced diameter, provided adjacent its end with outwardly turned flanges 32. Aligned, coaxial bores 34, 36 of any preferred diameter, are provided in the portions 28 and 30, and are separated by an integral partition 38. It will be understood that bores 34 and 36, may optionally consist of a single continuous bore within which the partition member 38, is separately mounted. The outer extremities of the bores are closed by appropriate, externally threaded and centrally apertured closure members 40 and 42, into which are fitted screw threaded nipples 44 and 46 respectively, for attachment to the pressure line 16, 16 in any customary manner.

The partition 38 is centrally apertured at 48 and is further perforated by a circular series of passages 50. A cup-shaped flexible valve member 52, appropriately formed of rubber or the like, is snugly received in the bore 34, seating upon the partition 38 and overlying the termination of passages 50. An axial bore 54 in the member 52 corresponds to and is aligned with the passage 48 and with an axial bore 56 in an annular valve seating member 58. The latter carries a circumferential retaining flange 60 for a spring 62, operatively disposed between said flange and a recess seat 64 in the closure cap 40, in a manner to resiliently bias the valve member 52 into sealing engagement with the passages 50.

Slidably disposed in the bore 36, is a plunger 66, loosely received for reciprocation and rotation therein. A valve member 68, protruding from the adjacent end of plunger 66, operatively cooperates with the axial passages 48 and 54 for a purpose to be later described. Integral stops or lugs 70 upon the juxtaposed extremity of the plug 42, provide limiting means to prevent the plunger 66 from obstructing the passage in the plug 42. Longitudinally disposed upon the periphery of plunger 66, are a plurality of helical or inclined flutes or grooves 72, providing fluid passages around the plunger and constituting plunger rotating and reciprocating means as hereinafter set forth.

Housed in a compartment 74, formed by the cylindrical wall of the reduced portion 30, the flange 32, a shoulder upon the member 28 and a sleeve 76 snugly embracing the flange 32, and screwthreadedly engaging the body member 28 as at 78, is an electro-magnetic coil 80. Terminals 82, 84, mounted upon the flange 32, are electrically connected to the extremities of the coil 80 and are engaged by conductors 86, 88, which, as shown in Figure 4, are connected to the positive and negative terminals of the conventional automobile storage battery 90. The conventional ignition switch 92 and the manually operable switch 94 are connected in series in the circuit with the battery and coil.

From the foregoing description the mode of operation will become apparent. Upon closure of the ignition switch 92, the device is prepared for use. With the manually operated switch 94 open, the hydraulic brake system will function in its normal manner as follows: Actuation of the brake pedal 12 will cause the pressure from the master cylinder 12 to travel through the locking cylinder 26, lines 16, 20 and 24 to the wheel cylinders, energizing the wheel brakes to the extent proportional to the degree of movement imparted to pedal 12. Referring to Figure 1, it can be seen that the pressure fluid from the master cylinder travels therefrom to the fitting 46, plug 42 and into the bore 36. The pressure impulse by-passes the loosely fitting plunger 66 through the grooves 72, the angularity of the latter effecting a rotation of the plunger. Under the impulse of the fluid displaced by the master cylinder, the plunger is forced into its position at the left end of the bore 36, thereby causing its valve 68 to enter and close the axial passage 48. This seating movement of the plunger has caused the expulsion of the fluid in front of the structure, through the passages 48, 50 and bores 54, 56 into the bore 34, whence it is forced by way of the aligned bores and plugs 40 and fitting 44 into the line 16 and thence to the wheel cylinders as described above. It is to be noted that movement of the plunger is effected by two combined factors, the flow of fluid pressing against the base of the plunger, and the reaction of the flowing fluid upon the inclined flute 72. This latter factor causes reciprocation of the plunger as well as rotation of the same. When the plunger has seated valve 68 in passage 48, continued flow of fluid is permitted by the flutes 72 and the passages 50. At this time the flexible sealing means or valve member 52 is deformed by the pressure allowing the fluid to enter the bore 34, to further augment the pressure applied to the brake cylinders.

Upon release of the brake pedal 12, the brake springs cause return flow in the reverse direction back to the master cylinder. However, in this operation, the plunger is displaced to the right end of bore 36, the valve 68 now unmasking the passage 48. The cup valve 52 now seals the bores 50 and the fluid returns through the axial passage through members 58, 52 and 38, and thence by way of the flutes 72 to the bores in members 42 and 46. It will be observed that in general the fluid medium, during such pressure actuation of the brakes, advances through passages 50 and returns through passage 48, in both directions causing the reciprocation and rotation of the plunger 66.

When it is desired to utilize the functions of this invention to selectively "freeze" the brakes, or prevent their reverse movement, the manual switch 94 is actuated, energizing the coil 80 and causing the plunger or solenoid 66 to be biased to the seating position of valve 68 with bore 48. All fluid in the lines is now trapped and the pedal 12 may be released by the driver at his convenience or according to the needs of the situation without any relaxing of the brake pressure on the wheel cylinders. Once the locking action has been inaugurated, the brakes can only be released by deenergization of the coil 80 which will permit plunger 66 to retract valve 68, opening the outlet port 48. However, the pressure of the brakes can be freely increased, if so desired. Further actuation of the pedal 12 will force additional fluid through grooves 72, passages 50, past the flexible valve 52 and into the brake pressure line. To release the hydraulic lock, it is merely necessary to manually actuate switch 94, deenergizing the coil 80 whereupon the fluid is released to flow back to the master cylinder in the manner described.

This arrangement is inherently capable of numerous advantages. As will be readily perceived, it provides a foolproof means for freezing or locking the hydraulic system in an existing state of actuation. It relieves the driver from exerting a constant foot pressure upon the pedal to maintain the brakes engaged or from the widespread and detrimental factors of holding the car on an incline by use of the clutch. It can freeze the brakes, as for an emergency stop or for parking, standing, etc., completely releasing the driver from further attendance upon the controls of the vehicle, if desired.

Moreover, it permits a driver and especially woman driver to effect a greater sustained brake pressure if desired. In this mode of employment it will be readily comprehended that an operator can physically exert a greater force, for short intervals, upon the brake pedal than he can sustain continuously. Consequently, the use of this lock will permit the holding and sustaining for indefinite periods, of the maximum pressure which the operator is capable of exerting for even the shortest interval. In other words, the optimum "pumping pressure" which the driver can exert is retained, a result impossible of attainment with the conventional hydraulic brake system.

The particular structure of the device as set forth above possesses numerous useful advantages and possibilities. For example, in some installations it may be preferable to cause reciprocation of the plunger and valve only by energizing the coil. This function could readily be attained by making the plunger 66 sufficiently heavy, the flutes 72 of sufficiently great cross-sectional area for the fit of plunger 66 in bore 36 of sufficient looseness, or any combination of these, for the fluid to pass the plunger with ease, without moving the latter. Alternatively, it may be preferable in certain installations to make the plunger respond to fluid movement, as set forth hereinbefore, in which case the solenoid would be required and used merely as a retaining means for the plunger and valve. The flutes serve to rotate as well as to assist in the reciprocation of the plunger. This rotation is advantageous for several reasons. First, it causes a relative rotation of the valve when engaging or leaving its seating engagement with the passage 48, thereby insuring even seating, the clearing away of any obstructions or deposits which might deleteriously effect the valve action and preventing actual wear from creating ridges in the seat. Second, the rotating action serves to prevent any tendency of the device to bind or seize in its bore due to "cocking" therein. Third, the edges of the flutes, will effect a scraping or knife action on the walls of the bore, maintaining them clean and free from the deposit of gummy matter or other obstruction.

It will be readily apparent, that I may, as the exigencies of the situation dictate, form the grooves as axial, straight, longitudinal grooves, inclined slots or as spiral flutes. Further, the plunger is of such construction that it may be expeditiously formed from a variety of materials. When a light weight construction is preferred, it may be formed largely of a suitable plastic, being readily adapted to molding, with efficient magnetic material being employed to enable action by the coil.

My invention further comprehends the use of a graduated series of interchangeable plungers for selective use in the bore 36, thereby adapting the device to a variety of special installations requiring varying characteristics of performance in the solenoid valve member.

Alternatively, the plunger may be constructed as shown in Figure 3, wherein a cylindrical member 166 carries the valve member 168 and is pierced by a series of axial bores 172, constituting by-pass elements. These bores may be disposed either as axial bores parallel to the cylinder axis, or as angularly inclined passages to effect the rotation of the member. This embodiment possesses the advantage that the plunger member may fit closer in the bore, with less frictional engagement therewith, due to the absence of external edges. Otherwise, the operation is the same as that of element 66 of Figure 1.

Attention is directed to the possibility of locating the switch 94 in various convenient positions. One such position which I find particularly advantageous is the mounting upon the rim or in proximity to the steering wheel where it may be manipulated without the necessity of releasing the steering wheel.

Although as shown, the hydraulic lock is incorporated between the master cylinder 14 and the coupling 18, in the single line 16 where it controls equally the operation of all the hydraulic brake cylinders, it is comprehended in the scope of this invention that it may be included in any line of the system to control a predetermined one or group of brake cylinders where its use to "freeze" or lock a portion only of the brake cylinders may be desirable.

Contributing to its adaptability to various systems and installations, is the ease of attachment. The only necessary alteration of an existing, operative system is the cutting of one fluid line and the connecting of the severed ends to the fittings 44 and 46.

The fewness of its moving parts, the simplicity of its construction all contribute towards its inexpensiveness and dependability, while its ease of operation greatly enhances the efficiency of the driver and of the vehicle.

I claim as my invention:

1. An electromagnetic valve assembly comprising a valve casing including a chamber therein, a partition disposed in said chamber, a solenoid coil surrounding said chamber and a solenoid plunger snugly fitted and slidable therein, a fluid passage through said partition and a valve on said plunger controlling said passage, additional passages in said partition, and fluid passages in said plunger.

2. The combination of claim 1 wherein said fluid passages include a plurality of spiral grooves provided in the outer periphery of said plunger.

3. An electromagnetic valve assembly comprising a valve casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, conduits on the opposite ends of said casing, and an annular valve seating member in said second chamber having a bore aligned with said fluid passage and spring means urging said sealing member and said valves toward said partition.

4. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, and conduit means on the opposite ends of said casing from said partition.

5. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, and conduit means on the opposite ends of said casing from said partition, said by-pass means being carried by said plunger.

6. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, and conduit means on the opposite ends of said casing from said partition, said by-pass means being carried by said plunger and being spirally inclined relative to the axis thereof to produce reciprocation and rotation of said plunger in response to passage of fluid therethrough.

7. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, second valve means in said second chamber yieldingly closing said additional passages, and conduit means on the opposite ends of said casing from said partition, said second valve means comprising a cup-shaped flexible member having a bore aligned with said fluid passage, said flexible member having sealing engagement with the walls of said second chamber.

8. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, second valve means in said second chamber yieldingly closing said additional passages, and conduit means on the opposite ends of said casing from said partition, said second valve means comprising a cup-shaped flexible member having a bore aligned with said fluid passage, said flexible member having sealing engagement with the walls of said second chamber, an annular valve seating member in said second chamber having a bore aligned with said fluid passage and spring means urging said seating member and valves toward said partition.

9. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, and conduit means on the opposite ends of said casing from said partition, said chambers being axially aligned.

10. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, and conduit means on the opposite ends of said casing from said partition, said chambers being axially aligned, said fluid passage being axial of said chambers and said additional passages being parallel to the axis of said chambers.

11. In a fluid pressure brake system for vehicles having a brake operating cylinder and a wheel brake cylinder connected therewith, a fluid flow control comprising a casing, a partition dividing said casing into first and second chambers, a solenoid coil surrounding said first chamber and a solenoid plunger snugly fitted and slidable therein, a fluid passage through said partition and a valve on said plunger controlling said passage, by-pass means connecting said first chamber with opposite ends of said plunger, additional passages through said partition, valve means in said second chamber yieldingly closing said additional passages, and conduit means on the opposite ends of said casing from said partition, said by-pass means being carried by said plunger and being formed as grooves in the exterior surface thereof.

HENRY NISSEN.

REFERENCES CITED

The following references are of record in the file of this patent:

UNITED STATES PATENTS

| Number | Name | Date |
|---|---|---|
| Re. 21,602 | Darling | Oct. 22, 1940 |
| 2,133,538 | Darling | Oct. 18, 1938 |
| 2,187,789 | Lanz | Jan. 23, 1940 |
| 2,217,141 | Sprenkle | Oct. 8, 1940 |
| 2,262,842 | Goepfrich | Nov. 18, 1941 |
| 2,289,563 | Wood | July 14, 1942 |
| 2,297,076 | Sacks et al. | Sept. 29, 1942 |
| 2,322,911 | Beam | June 29, 1943 |
| 2,329,156 | Coffey | Sept. 7, 1943 |
| 2,391,017 | Grontkowski | Dec. 18, 1945 |
| 2,391,129 | Chambers | Dec. 18, 1945 |

FOREIGN PATENTS

| Number | Country | Date |
|---|---|---|
| 557,981 | Great Britain | Dec. 14, 1943 |